United States Patent
Staschewski et al.

(10) Patent No.: US 6,223,407 B1
(45) Date of Patent: May 1, 2001

(54) APPARATUS FOR MANUFACTURING AN OPTICAL FIBER CABLE

(75) Inventors: Harry Staschewski, Langehnhagen; Klaus Porcher, Lehrte; Hans-Joachim Arntz, Langenhagen; Friedrich Harten, Hannover, all of (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/325,421

(22) Filed: Jun. 4, 1999

(30) Foreign Application Priority Data

Jun. 6, 1998 (DE) ............................................. 198 25 423

(51) Int. Cl.⁷ ..................................................... B23K 5/06
(52) U.S. Cl. ........................... 29/33 D; 228/17.5; 228/42; 228/148
(58) Field of Search ................................. 29/33 D, 33 T; 228/17.5, 42, 146–151, 219, 220; 219/61.11, 121.63, 121.64; 277/602

(56) References Cited

U.S. PATENT DOCUMENTS

| Re. 35,378 | * | 11/1996 | Krengel et al. | 228/147 |
|---|---|---|---|---|
| 4,269,639 | * | 5/1981 | Lewis | 156/54 |
| 4,508,423 | * | 4/1985 | Winter et al. | 228/148 |
| 4,554,116 | * | 11/1985 | Cooke | 264/1.28 |
| 4,811,888 | * | 3/1989 | Ziemek et al. | 228/148 |
| 5,121,872 | * | 6/1992 | Legget | 228/148 |
| 5,143,274 | * | 9/1992 | Laupretre et al. | 228/148 |
| 5,238,172 | * | 8/1993 | Le Davay | 228/148 |
| 5,395,557 | * | 3/1995 | Griser et al. | 264/1.28 |
| 5,582,748 | * | 12/1996 | Yoshie et al. | 219/121.64 |
| 5,613,631 | * | 3/1997 | Ziemek et al. | 228/148 |
| 5,722,581 | * | 3/1998 | Sindzingre et al. | 228/219 |
| 5,759,454 | * | 6/1998 | Le Gac et al. | 228/148 |
| 5,760,364 | * | 6/1998 | Marlier et al. | 219/121.64 |
| 5,768,762 | * | 6/1998 | Ziemek et al. | 228/148 |
| 5,975,404 | * | 11/1999 | Ziemek et al. | 228/17.5 |
| 6,018,859 | * | 2/2000 | Borzym et al. | 228/147 |

FOREIGN PATENT DOCUMENTS

| 43 28 780 | * | 3/1995 | (DE) . | |
|---|---|---|---|---|
| 0 299 123 | * | 1/1989 | (EP) . | |
| 2 193 450 | * | 2/1988 | (GB) . | |
| 39-18657 | * | 9/1964 | (JP) | 228/147 |
| 59-97717 | * | 6/1984 | (JP) | 228/148 |
| 130029 | * | 6/1959 | (SU) | 228/219 |

* cited by examiner

Primary Examiner—A. L. Wellington
Assistant Examiner—Erica Ergenbright
(74) Attorney, Agent, or Firm—Sughrue, Mion, Zinn, Macpeak & Seas, PLLC

(57) ABSTRACT

In an apparatus for manufacturing an optical fiber cable that includes a metal tube (3) in which at least one optical fiber (2) is arranged in a viscous plastic mass, which apparatus includes a device continuously forming a metal strip (5) into a slit tube, a welding device (7), and a charging tool with at least one tube (22b) whose one end projects into the slit tube (22b), whereby the tube introduces the optical fibers (2) into the metal tube (3), the one tube (22b) has an indentation (22d) on its surface facing the welding device (7), which is covered toward the top and thus forms a channel (22f), and a coolant gas or protective gas is directed through this channel (22f).

18 Claims, 7 Drawing Sheets

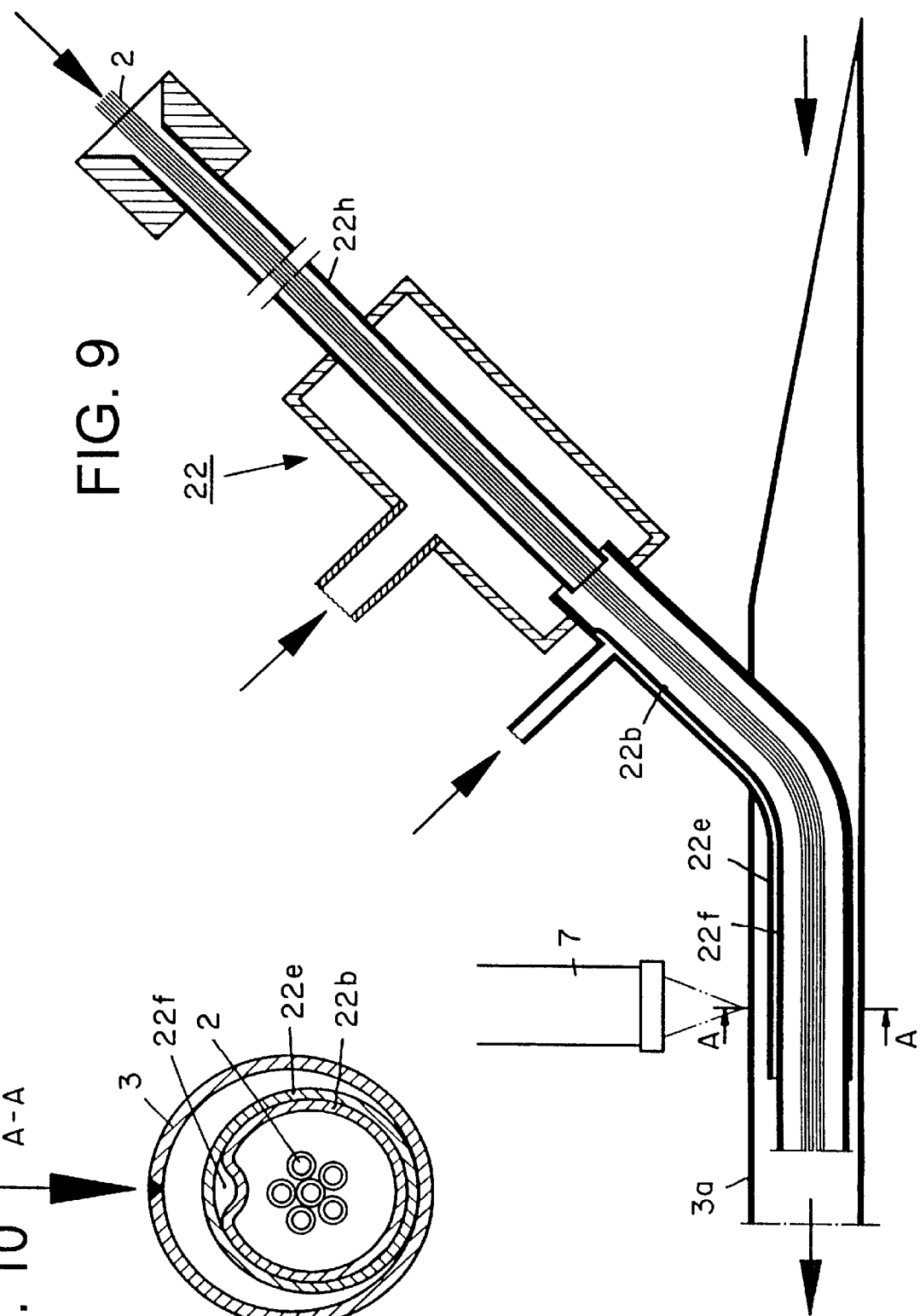
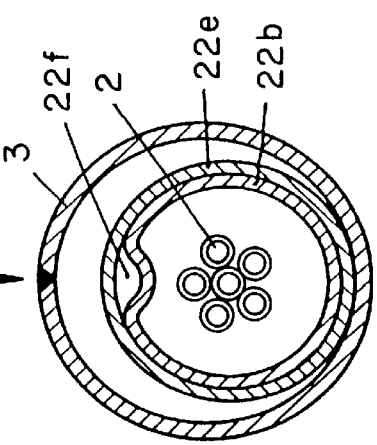
FIG. 9
FIG. 10

APPARATUS FOR MANUFACTURING AN OPTICAL FIBER CABLE

BACKGROUND OF THE INVENTION

The invention relates to an apparatus for manufacturing an optical fiber cable.

DE-A-44 34 133 discloses an apparatus for manufacturing an optical fiber cable comprising a supply coil from which a metal strip is drawn off, a forming apparatus for forming the metal strip into a tube, a welding device for closing the longitudinal slit of the metal tube, and at least one supply coil from which an optical fiber is drawn off and inserted into the still open metal tube. To protect the optical fiber(s) against mechanical and thermal influences, they are inserted into a small tube that projects into the slit tube and ends behind the weld point to release the optical fibers.

To make the optical fiber cable longitudinally watertight and to protect the optical fibers located within the metal tube against mechanical influences, the interior of the metal tube is filled with a viscous plastic mass. Petroleum jelly is typically used for this purpose.

The petroleum jelly is introduced into the cable by an additional tube that encloses the tube carrying the optical fiber. The petroleum jelly is piped into the metal tube under pressure through the annular gap between the tubes.

SUMMARY OF THE INVENTION

The object of the present invention is to improve the known apparatus so as to prevent any influence on the optical fibers or the filler mass in the area of the weld point. The apparatus for manufacturing an optical fiber cable including a metal tube in which optical fibers are arranged in a viscous plastic mass, according to the present invention, includes a device for continuously forming a metal strip into a slit tube, a welding device, and a charging tool with at least an outer tube whose one end projects into the slit tube, whereby the outer tube introduces the optical fibers into the metal tube, the outer tube having an indentation on its surface facing the welding device which is covered at the top using a cover, a channel being formed between the cover and the outer tube, and a coolant gas or protective gas is directed through the channel.

BRIEF DESCRIPTION OF THE DRAWING

The invention is described in further detail by means of the schematically depicted exemplary embodiments shown in the accompanying figures, wherein:

FIG. 4 shows a part of the charging tool 22 that projects into the as yet unreduced metal tube 3a;

FIGS. 5 and 6 show a cross-section through the part of the charging tool 22 located within metal tube 3a;

FIGS. 9 and 10 show an additional exemplary embodiment of the invention.

DETAILED DESCRIPTION OF THE PREFERRED EMBODIMENT

Figure 1:
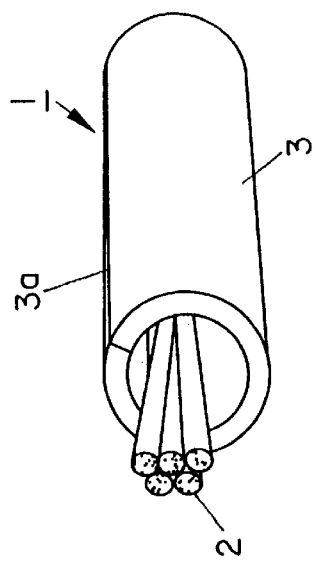
FIG. 1 is a perspective view of a portion of an optical fiber cable produced according to the invention.

FIG. 1 is a perspective view of a portion of an optical fiber cable produced according to the teaching of the invention.

Optical cable 1 comprises optical fibers 2 and metal tube 3, which encloses optical fibers 2 and which has a longitudinal weld seam 3a. The clearance between optical fibers 2 and metal tube 3 is filled with petroleum jelly to prevent any longitudinal water migration. The number of optical fibers 2 typically ranges from six to forty-eight, but can be as many as one hundred and forty. The optical fibers 2 are longer than the metal tube 3 and thus extend in wave, spiral, or sinusoidal form within metal tube 3. The excess length is typically approximately 3%. The wall thickness S of the metal tube 3 is, for example, 0.2 mm, while its outside diameter is 3.5 mm. These are typical data for an optical fiber cable used instead of a wire in a stranded conductor. The preferred material for metal tube 3 is high-grade steel. For higher fiber counts, wall thickness S is increased up to 0.4 mm and the outside diameter up to 6 mm.

Figure 2:
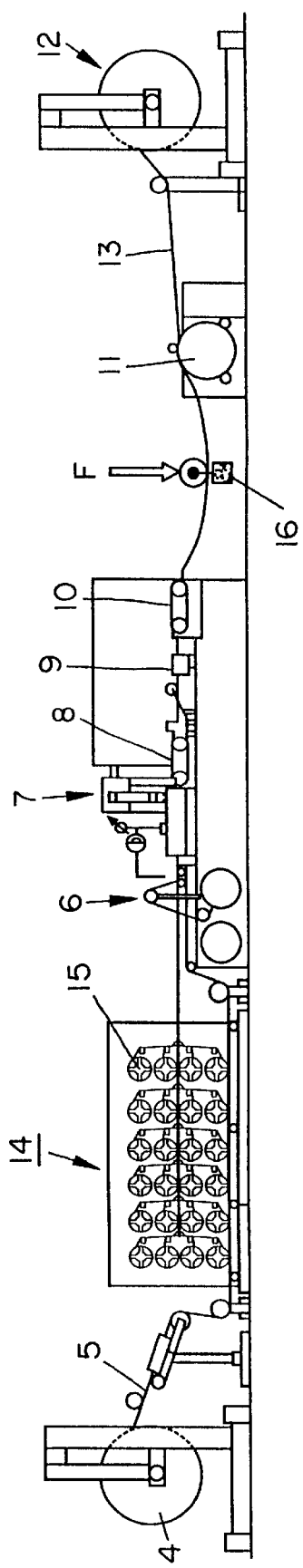
FIG. 2 is a side view of an apparatus for manufacturing the optical fiber cable of FIG. 1.

FIG. 2 is a side view of an apparatus for manufacturing such an optical fiber cable.

From a supply spool 4 a strip 5 is continuously drawn off and supplied to a forming device 6 in which strip 5 is formed into a tube with a longitudinal slit. Part of this forming device 6 is a trimming device, which is not further defined, in which strip 5 is cut to exactly the required width. Forming device 6 furthermore comprises a plurality of roller sets that are not further described. The longitudinal slit of the formed tube is closed by means of a laser welding device 7. Exact guidance of the slit tube below the welding device 7 is provided by a first clamping jaw extractor 8 comprising a plurality of clamping jaw pairs enclosing the tube, which are driven by an endless chain. Behind the first clamping jaw extractor 8 is a tube reduction device 9, e.g., a drawing die, to reduce the tube diameter. A second clamping jaw extractor 10 is arranged behind the tube reduction device 9 and engages with the drawn tube to pull it through the drawing die. The extraction speed of the second clamping jaw extractor 10 is controlled with respect to the extraction speed of the first clamping jaw extractor 8 as a function of the sag of the tube between the drawing die and the first clamping jaw extractor 8. Behind the second clamping jaw extractor 10 is a driven extractor disk 11 on whose circumferential surface the tube rests with several turns. The extraction disk 11 is driven at an extraction speed, which equals the extraction speed of the second clamping jaw extractor 10. Behind extraction disk 11 is a winding reel 12, which winds up tube 13 with a slight tension.

Reference numeral 14 identifies a process device for a plurality of optical fibers 2 that is equipped with a plurality of coils 15 onto which the optical fibers 2 are wound.

The optical fibers 2 are drawn off coils 15 and introduced into the still open tube in front of the welding device. To protect the sensitive optical fibers 2, a stationary metal tubule (not depicted) through the interior of which the optical fibers 2 are guided projects into the slit tube. The metal tubule releases the optical fibers 2 no earlier than behind welding device 7. The metal tubule is enclosed by an additional metal tubule. Through the annular gap formed by the two concentric metal tubules, petroleum jelly is piped under pressure into metal tube 3. In order to ensure that the optical fibers 2 are present with excess length in metal tube 3, metal tube 3 is continuously elastically deformed, i.e., stretched, between the second clamping jaw extractor 10, whose clamping jaw pairs firmly encircle metal tube 3 and apply the deformation forces produced by the tube reduction, and extraction disk 11. This causes an equal length of metal tube 3 and optical fibers 2 to be wound onto extraction disk 11. On extraction disk 11, the elastically deformed state "relaxes" and metal tube 3 is shortened to its normal state.

The elastic deformation is caused by a force F, which deflects the metal tube 3 between the second clamping jaw extractor 10 and the extractor disk 11. This is achieved by a weight 16 that is attached to the metal tube 3, e.g., by a roller (not depicted). Force F, i.e. weight 16, determines the extent of the deflection and thus the extent of the stretching.

For the specified geometry and material selection of metal tube 3, the selection of weight 16 makes it possible to produce an exact overlength of the optical fibers 2 within tube 3.

Figure 3:
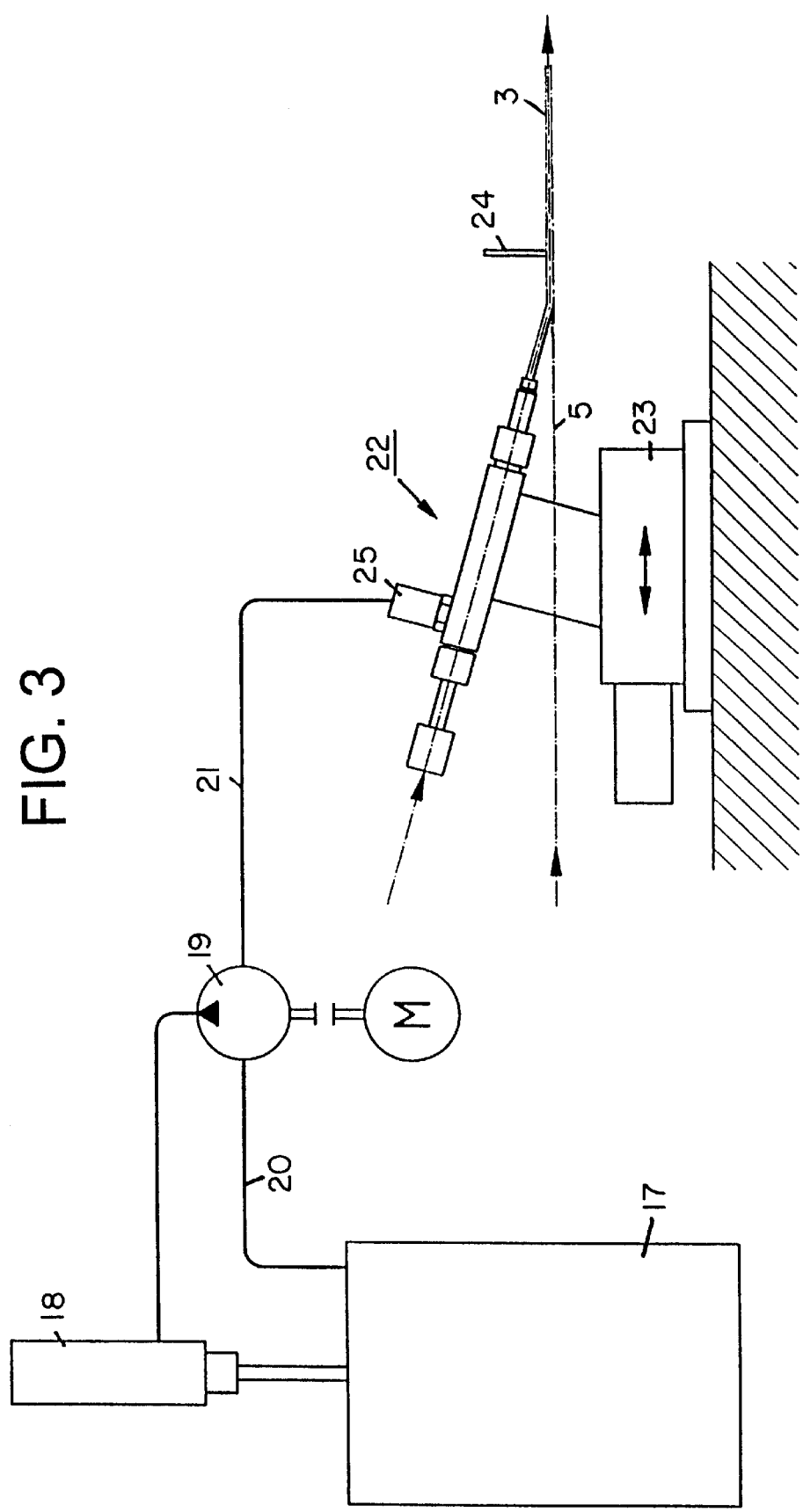
FIG. 3 shows a part of the apparatus used to pipe the petroleum jelly into metal tube 3.

FIG. 3 shows the part of the apparatus used to pipe the petroleum jelly into metal tube 3.

The petroleum jelly is delivered in a barrel 17 and is pumped out of this barrel by a barrel pump 18. For this purpose, the petroleum jelly, a viscous mass at room temperature, is heated to the point where it is flowable. From barrel pump 18, the petroleum jelly is transported to a high-precision metering gear pump 19, which pumps the petroleum jelly in pressure- or speed-regulated manner into charging tool 22, which will be described in detail below. Any excess petroleum jelly is transported back into barrel 17 via a bypass line 20. A temperature-controlled supply line 21 transports the heated petroleum jelly to the charging tool 22, which is also temperature-controlled. Supply line 21 is connected with charging tool 22 through a quick-release coupling 25 to make it easy to introduce charging tool 22 into metal tube 3 or 3a on startup of the manufacturing process.

The optical fibers 2 are also introduced into the charging tool 22.

Charging tool 22 is mounted on a displacement slide 23, which is incrementally or permanently adjusted in manufacturing direction by manual or electrical means. The adjustment rate may be set as a function of the production speed, the contamination level of the metal strip 5, etc., but it is always set very low, e.g., at increments of 3 mm/3 h or at v=1 mm/h.

This has the advantage of preventing any negative influence on the charging tool 22, e.g., by combustion residues in the area of the weld point. The adjustment causes the area of the charging tool 22 with the combustion residues to be shifted out of the weld range.

To ensure that the charging tool 22 in the welding area is as far away as possible from the weld point of metal tube 3, which is located at the top, a spring-loaded pin 24 presses the portion of the charging tool 22 projecting into the metal tube 3 onto metal strip 5 or against the lower area of the slit tube.

Figure 4:
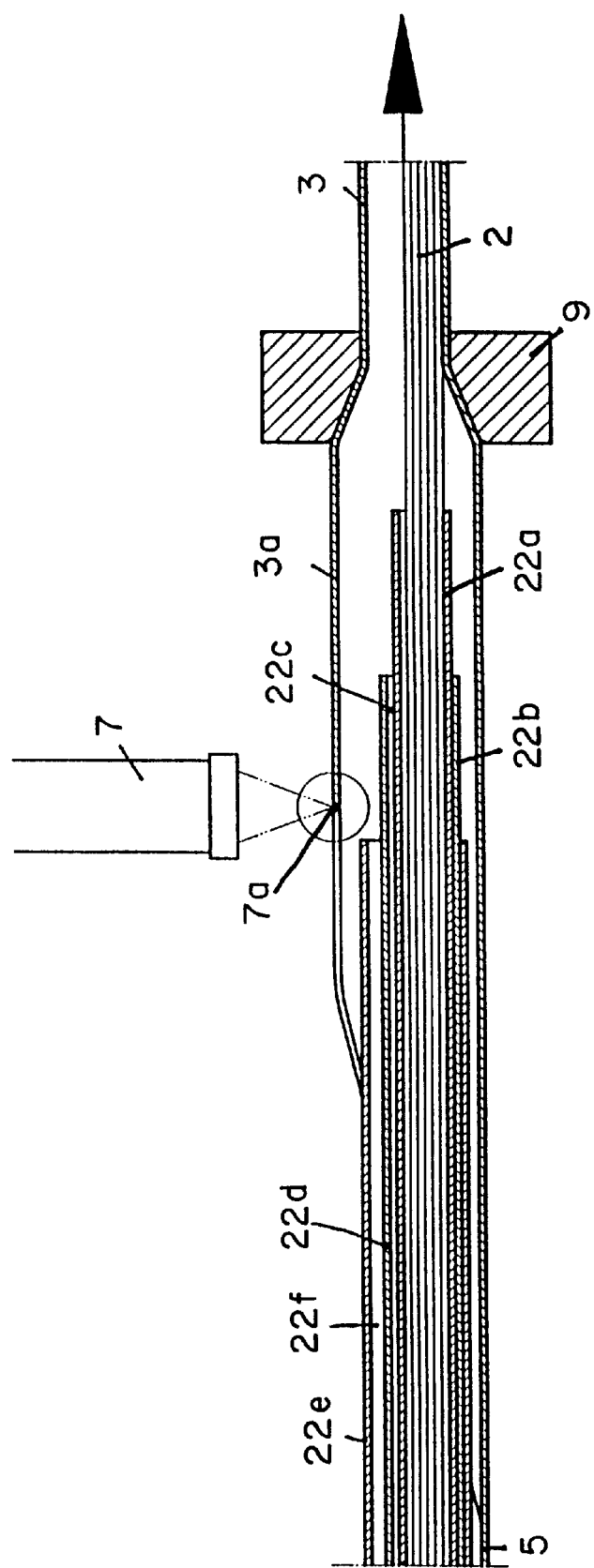

FIG. 4 shows the part of the charging tool 22 that projects into the as yet unreduced metal tube 3a. This part of the charging tool 22 comprises an inner tube 22a guiding the optical fibers 2 and an outer tube 22b with a significantly greater diameter enclosing inner tube 22a. The petroleum jelly is piped into the metal tube 3a through gap 22c between tubes 22a and 22b. Both inner tube 22a and outer tube 22b open out behind weld point 7a such that both the petroleum jelly and the optical fibers 2 are protected against excessive heat. The outer tube 22b has an indentation 22d provided with a cover 22e so as to form a channel 22f through which a coolant or protective gas may be directed into the welding area. Argon is preferred for this purpose.

The gas exits from channel 22f and flows around the lower weld seam area to cool this area and protect it from oxidation. The gas exits from channel 22f and is directed against the production flow out of metal tube 3a toward the exterior.

Figure 5:
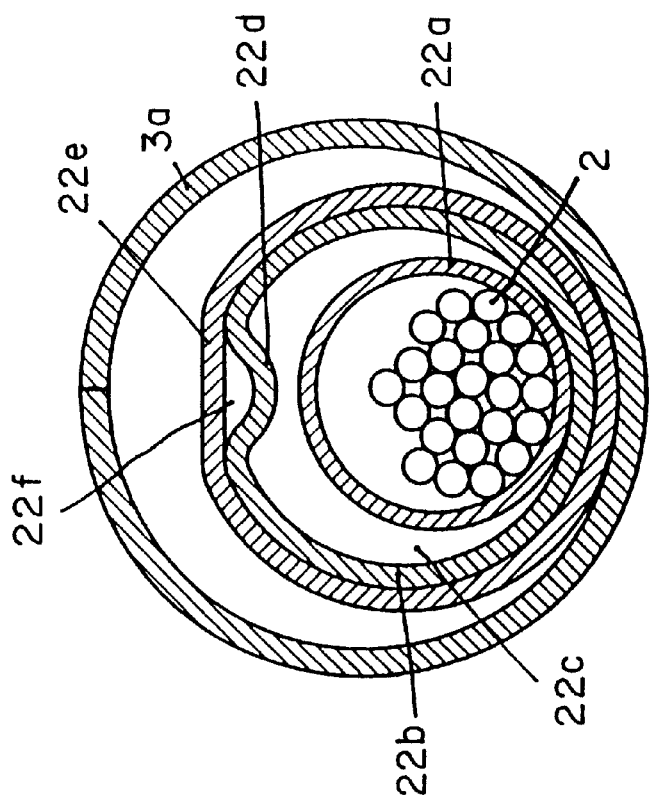
Figure 6:
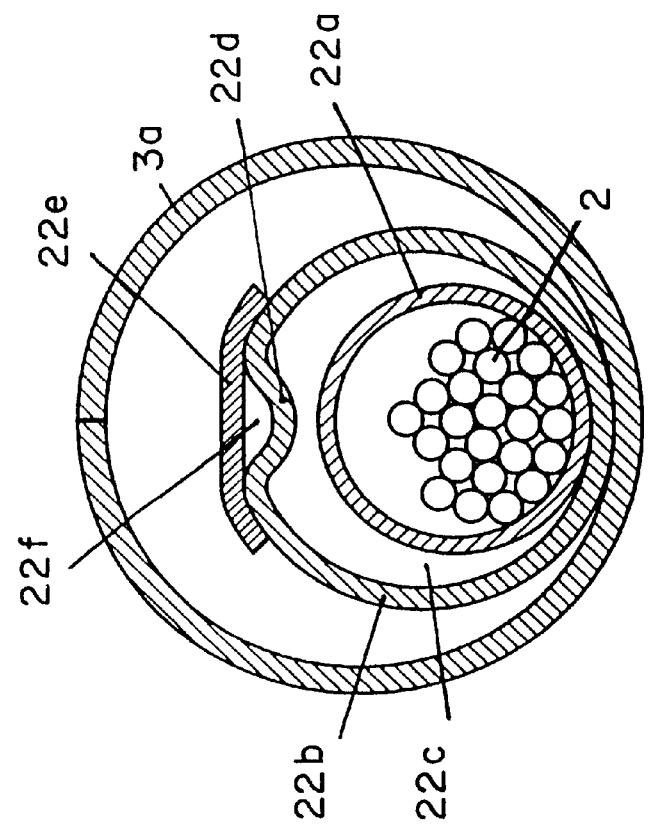

FIGS. 5 and 6 show a cross-section through the part of the charging tool 22 located within metal tube 3a. In FIG. 5, cover 22e is a metal strip covering indentation 22d, which is, for example, soldered to outer tube 22b. In FIG. 6, cover 22e is a tube formed over outer tube 22b, which is flattened in the area of indentation 22d. As may be clearly seen in FIGS. 5 and 6, the portion of charging tool 22 located within metal tube 3b has the greatest possible distance from weld point 7a.

Figure 7:
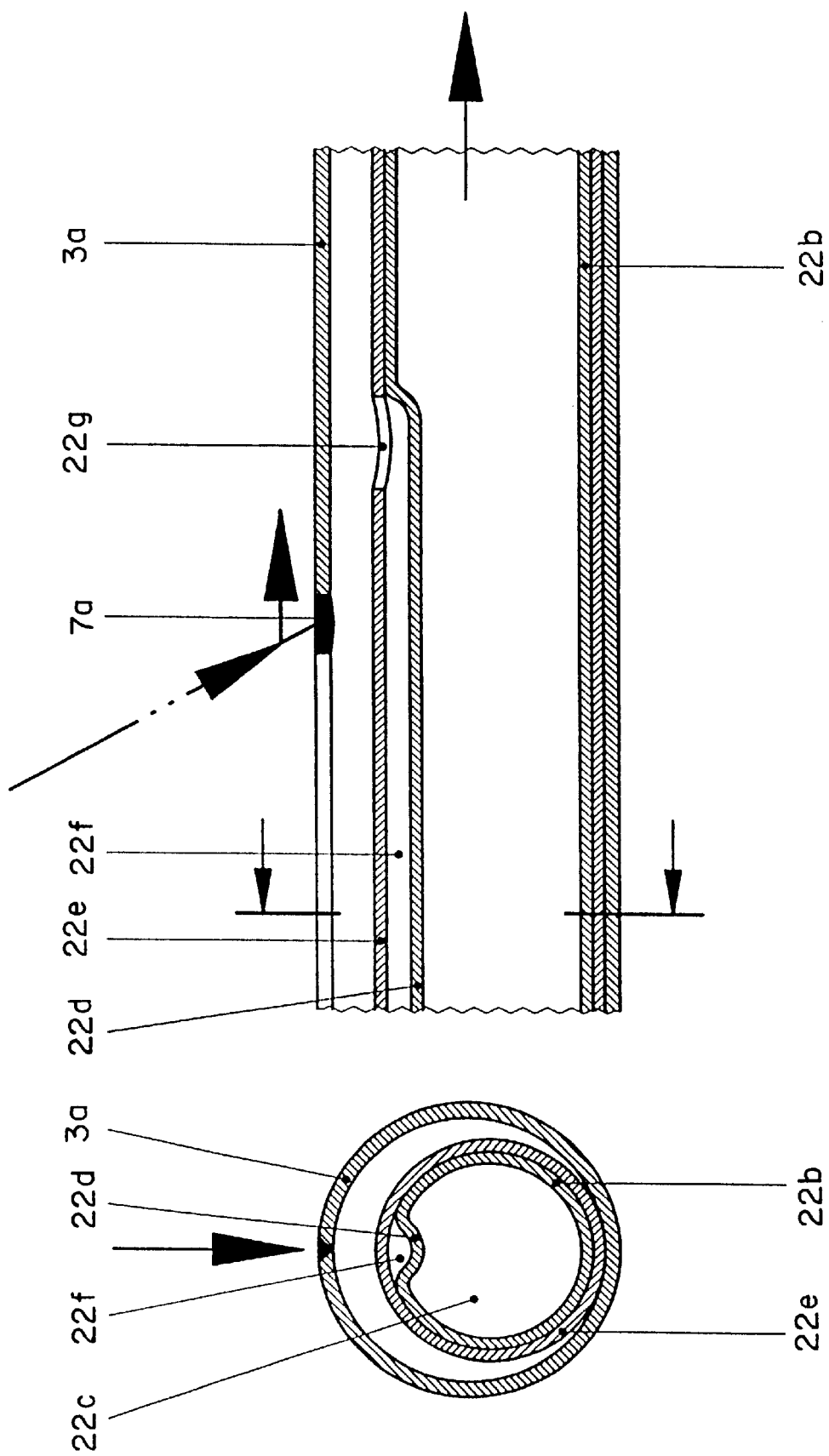
FIG. 7 shows an alternative configuration for the gas exit point.

In FIG. 4, the exit point for the gas is in front of weld point 7a as viewed in the production direction. An alternative thereto is shown in FIG. 7. In this case, cover 22e is formed by a tube that is pulled onto outer tube 22b. Here, channel 22f ends behind weld point 7a. An outflow opening 22g provided in cover 22e permits the gas to exit behind weld point 7a. This has the advantage that in case of a weld discontinuity, the laser beam does not strike the area of the charging tool 22, which is under high pressure. The pressure in gap 22c is up to 25 bar. In channel 22f, there is almost no pressure.

Figure 8:
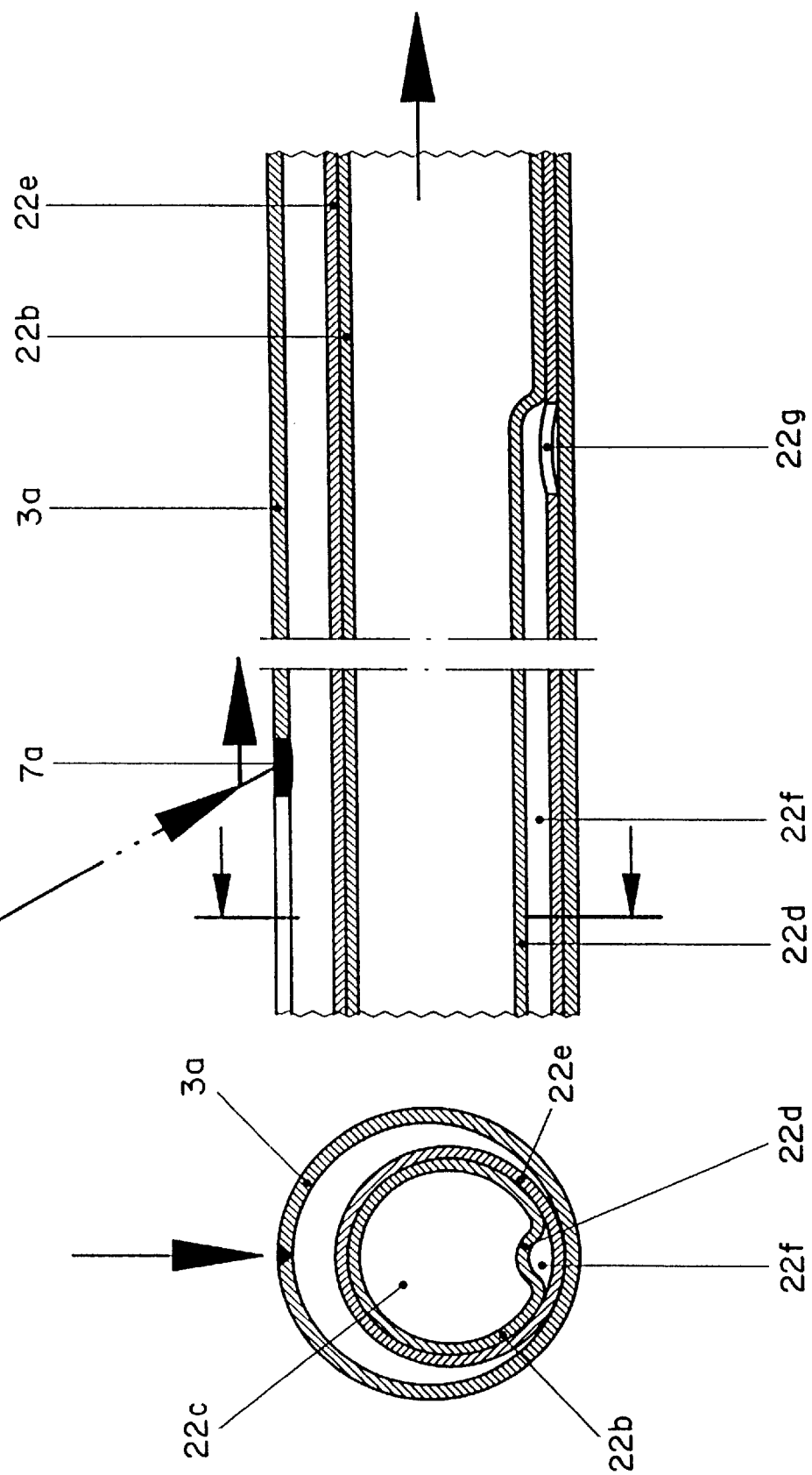
FIG. 8 shows an alternative location for the channel 22f.

An additional alternative is shown in FIG. 8. Here, channel 22f is located below.

In the exemplary embodiments shown in FIGS. 7 and 8, the inner tube for guiding the optical fibers has been omitted for clarity's sake.

The advantage of this embodiment is that the charging tool 22 is slightly lifted as the gas flows out of opening 22g so that the gas can freely exit and cool the entire outer surface of the charging tool.

FIGS. 9 and 10 show an additional exemplary embodiment of the invention. Charging tool 22 comprises tubes 22b and 22e whose ends project into metal tube 3a. The end of a tube 22h, through which optical fibers 2 are guided, projects into the outwardly pointing end of tube 22b. The viscous plastic mass penetrates into tube 22b through the gap between tubes 22h and 22b and is transported jointly with the optical fibers 2 into metal tube 3a.

This embodiment is advantageous when producing optical fiber cables with only a few optical fibers 2 and a correspondingly small metal tube 3. In such cables, it would be impossible to introduce the viscous plastic mass into the small cross section of the metal tube because of the very high pressure that would be required.

To solve this problem, the length of tube 22h is such that the pressure in the viscous plastic mass is gradually reduced if the mass flows back against the feed direction of the optical fibers 2 so as to prevent the viscous plastic mass from exiting at the end where the optical fibers are entering. Tube 22h may furthermore be cooled from the outside to cool the mass in tube 22h and thus increase its viscosity.

What is claimed is:

1. An apparatus for manufacturing an optical fiber cable including a metal tube, in which optical fibers are arranged in a viscous plastic mass, said apparatus comprising:

a device for continuously forming a metal strip into a slit tube, a welding device, and a charging tool with at least a first tube whose end projects into the slit tube, whereby the first tube introduces the optical fibers and the viscous plastic mass into the metal tube, wherein a surface of the first tube proximate and opposed to the welding device, has an indentation and wherein a cover covers said first tube at a position opposed to said indentation a channel being formed between said cover and said first tube, and one of a coolant and a protective gas is directed through said channel via a coolant or protective gas supply device.

2. An apparatus according to claim 1, wherein the optical fibers and the viscous plastic mass are carried in the first tube and introduced into the metal tube.

3. An apparatus according to claim 1, wherein a second tube is arranged in said first tube (22*b*) and the optical fibers are carried in the second tube and the viscous plastic mass is carried in a first gap between said second tube and said first tube.

4. An apparatus according to claims 1 or 2, wherein an end of a third tube projects into an end of said first tube located outside the metal tube, which third tube introduces the optical fibers into said first tube, and wherein the viscous plastic mass is pressed into said first tube through a second gap between said first tube and said third tube.

5. An apparatus according to claim 4, wherein a length of said third tube is such that the viscous plastic mass is transported only in a direction of a length of the metal tube.

6. An apparatus according to claim 5, wherein said third tube is cooled from an outside of said third tube.

7. An apparatus according to claim 3, wherein said second tube and said first tube as well as the cover of the indentation are made of metal.

8. An apparatus according to claims 3 or 7, wherein a direction of manufacturing of said optical fiber cable is in a direction in which said optical fibers are introduced into said first tube, and wherein said first tube and said second tube terminate on a side of a weld point downstream of said weld point with respect to said manufacturing direction, and wherein said second tube protrudes from said first tube.

9. An apparatus according to claim 3, wherein a tool presses said second tube and said first tube, as well as the cover, onto one of a metal strip, an area of the slit tube, and an area of the metal tube that is opposite to a weld point.

10. An apparatus according to claim 3, wherein said second tube and said first tube as well as the cover are arranged on a displacement slide.

11. A apparatus according to claim 1, wherein a direction of manufacturing of said optical fiber cable is in a direction in which said optical fibers are introduced into said first tube, and wherein the cover for the indentation terminates on a side of a weld point upstream of said weld point with respect to said manufacturing direction.

12. An apparatus according to claim 1, wherein a direction of manufacturing of said optical fiber cable is in a direction in which said optical fibers are introduced into said first tube, and wherein the indentation extends to a position downstream, with respect to said manufacturing direction, and adjacent, a weld point, and at an end of the indentation an outflow opening is provided in the cover for one of the coolant and protective gas to exit.

13. An apparatus according to claim 1, wherein the cover is formed by a tube enclosing said first tube.

14. An apparatus according to claim 1, wherein the cover is formed by a strip covering the indentation.

15. An apparatus according to claim 1, wherein a supply container for the viscous plastic mass, a first pump for delivering the viscous plastic mass, and a second metering gear pump are provided, whereby the second pump delivers the mass into the metal tube in a controlled manner as a function of one of pressure and speed.

16. An apparatus according to claim 15, wherein a bypass line is provided to direct any excess mass into the supply container.

17. An apparatus according to claim 15, wherein there is provided a delivery line between the second pump and a start of said second tube, and at least one of said second tube and said first tube, are heated.

18. An apparatus according to claim 17, wherein heating of said at least one of said second tube and said first tube is temperature-controlled.

\* \* \* \* \*